United States Patent
Zuccarini

[11] Patent Number: 5,802,696
[45] Date of Patent: Sep. 8, 1998

[54] PROCESS FOR CASTING A PLASTIC DIE

[75] Inventor: John J. Zuccarini, Metamora, Mich.

[73] Assignee: Plasco Corporation, Romeo, Mich.

[21] Appl. No.: 740,965

[22] Filed: Nov. 5, 1996

[51] Int. Cl.$^6$ .............................. B23Q 3/00; B29C 33/40
[52] U.S. Cl. ................. 29/468; 29/525.12; 29/527.1; 29/558; 264/162; 264/219; 249/142; 249/176; 249/177
[58] Field of Search ................. 249/176, 177, 249/142; 264/162, 219; 29/468, 557, 558, 525.11, 525.12, 525.02, 525.04, 527.1

[56] References Cited

U.S. PATENT DOCUMENTS

| | | | |
|---|---|---|---|
| 1,642,980 | 9/1927 | Turner . | |
| 2,310,830 | 2/1943 | Blair et al. | 18/34 |
| 2,447,620 | 8/1948 | Singleton et al. | 76/107 |
| 2,565,134 | 8/1951 | Kish | 18/55 |
| 2,632,922 | 3/1953 | Kish | 18/59 |
| 2,705,375 | 4/1955 | Foreman et al. | 29/467 |
| 2,715,280 | 8/1955 | Kish | 33/174 |
| 2,750,632 | 6/1956 | Kish | 18/59 |
| 2,776,453 | 1/1957 | Kish | 18/59 |
| 5,009,826 | 4/1991 | Walker | 264/154 |
| 5,529,733 | 6/1996 | Lee | 264/273 |
| 5,608,961 | 3/1997 | Piegeler | 29/452 |

*Primary Examiner*—Jan H. Silbaugh
*Assistant Examiner*—Suzanne E. Mason
*Attorney, Agent, or Firm*—Young & Basile, P.C.

[57] ABSTRACT

A method for casting a plastic die including constructing an open ended container having a floor configured to the desired contour shape of the die. The open ended container is segmented by longitudinal members and traversing members. A plurality of box-shaped cores are spaced within the container and secured in place by the traversing members. A cavity is formed in the container therebetween for the injection of hardenable material.

8 Claims, 4 Drawing Sheets

PROCESS FOR CASTING A PLASTIC DIE

FIELD OF THE INVENTION

The invention relates to a casting process to form a die having a multidirectional surface. In particular, the invention provides a method of producing plastic dies for tooling suitable for use in forming sheet metal, aluminum or other metals, including a technique such as stretch forming, hydroforming, stamping ect.

BACKGROUND OF THE INVENTION

In the aeronautics industry, for example, the manufacturing of exterior surface portions of the wings and fuselage involve a number of expensive tooling operations. In addition, the massive dimensions needed in the preparation of a master die model for these exterior surface portions can be cumbersome and heavy. It is necessary therefore, that the master die model be easily movable or transportable to the manufacturing facility of the airplanes. It is also necessary to provide a master model die cost effectively that eliminates some of the expensive tooling operations to produce the die. It is also necessary to produce a model die that is rigid yet relatively lightweight and easily transportable to the manufacturing point.

SUMMARY OF THE INVENTION

The process of the current invention for making a plastic die includes constructing a wood lattice framework having a top surface in the desired contour shape. The lattice framework is built up on the sides of the wooden framework so that the contoured shape top surface forms the floor of the boxed-in model. Longitudinal rods are equally spaced from one end to traverse the opened upper end of the boxed-in wood model. The longitudinal rods include upwardly facing rings or eyelets for the insertion of lateral rods therein. The rings retain the lateral rods in alignment. The lateral rods function to secure wooden cores within the boxed-in model. A plurality of rectangular or square wooden cores are inserted into the wood model. The wooden cores are spaced from each other by the longitudinal rods and are placed into the boxed-in model so that the bottom of each wooden core is spaced essentially the same distance from the contour floor. The lateral rods are fed through apertures in the wooden cores to hold the wooden cores at a predetermined level above the contour floor. The cavity within the boxed-in model surrounding the wooden cores is filled with a resin material or other appropriate hardenable material. The exterior of the wood cores may be previously coated before insertion into the boxed-in model with a wax-type material so that the cores do not adhere to the resin and may be easily removed from the boxed-in model once the resin has solidified. A honeycombed surface is then provided by the removal of the cores after the resin has solidified, and the honeycomb surface forms a bottom surface for the die. The sides and the lattice framework can then be removed from the die so that the desired contour surface is exposed. The contour surface is finally machined to finish the contour to the precise die form.

It is the intent of this invention to provide a novel method of casting a plastic die for large structures such as those required in the aeronautics industry.

It is another object of this invention to provide a cost effective method of casting a plastic die for such structures.

It is further an object of this invention to provide a method of casting a plastic die that provides a relatively lightweight, yet strong die.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
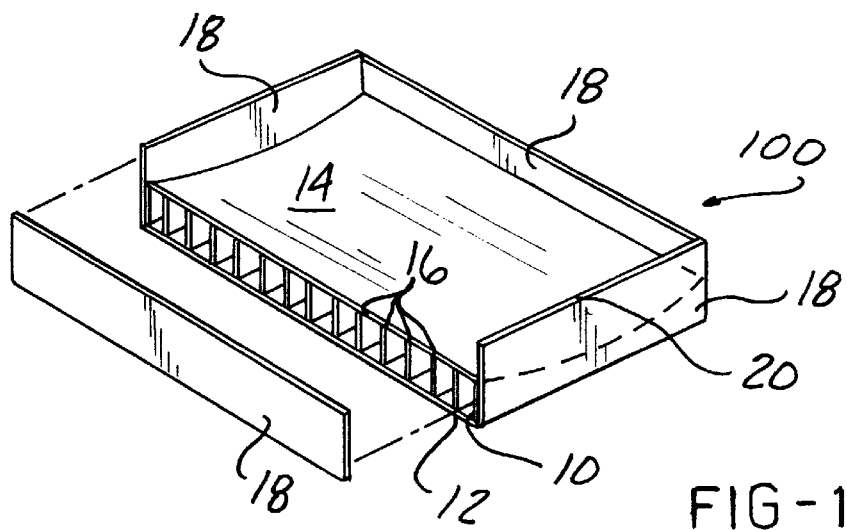
FIG. 1 is a perspective view of the first stage of the die producing structure embodying the invention.

The FIGS. 1–9 illustrate the steps for producing and casting a plastic die using a die producing structure 100 that is easily assembled and that provides a lightweight mold or die that is easily transportable. As seen in FIG. 1, a lattice framework 10 is initially constructed. The lattice structure 10 forms a base of the die producing structure 100 and has a bottom planar surface 12 and a top surface 14. The top surface 14 is formed to essentially duplicate the contour surface of the desired shape for the final die. A series of vertical extensions 16 extend from the bottom surface 12 to the top surface 14. The vertical extensions 16 have varying lengths to conform with the contoured top surface 14. The lattice framework 10 is then enclosed or boxed in at all four sides with upwardly extending walls 18 such that the sides of the lattice framework 10 are entirely enclosed and the contoured top surface 14 now defines the floor of the die producing structure 100. The die producing structure 100 has an open ended upper portion 20.

Figure 2A:
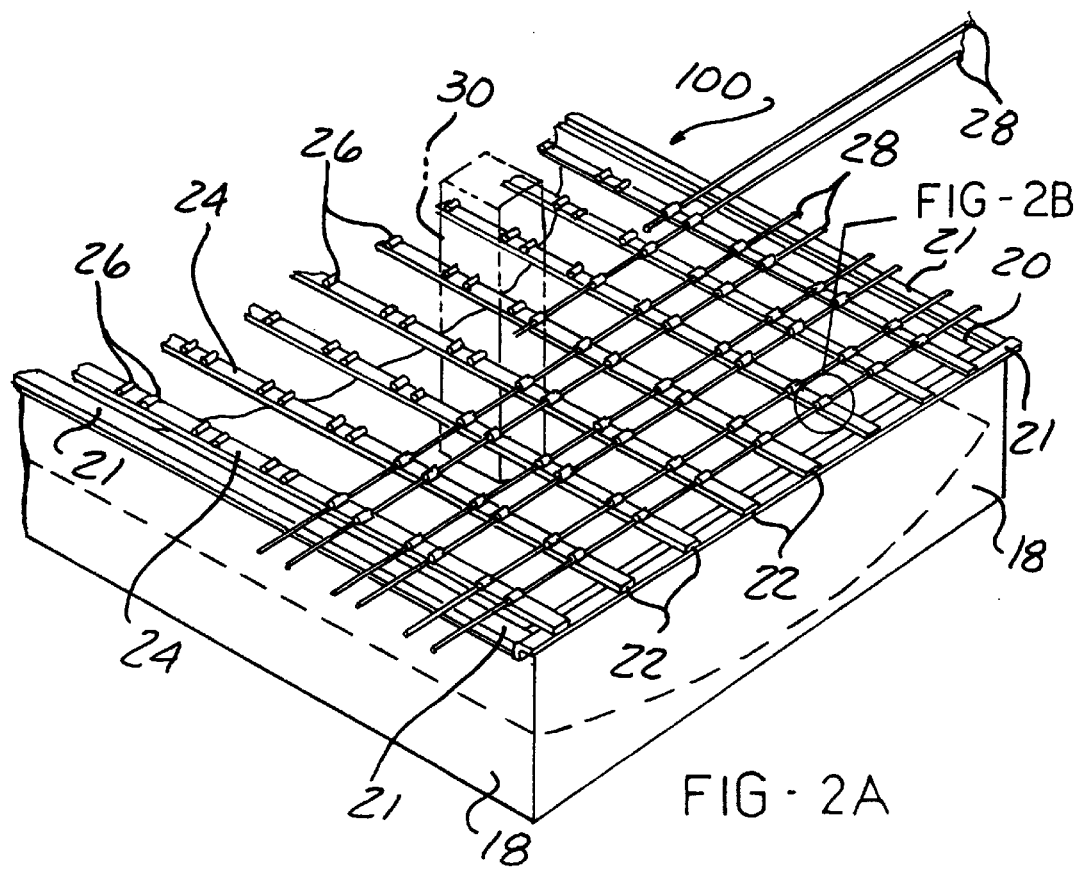
FIG. 2A is a perspective view showing longitudinal rods and traverse rods traversing an upper portion of the die producing structure.
Figure 2B:
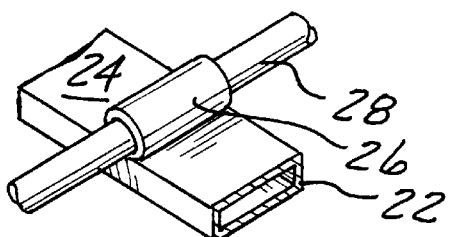
FIG. 2B, is an enlarged view of one of the longitudinal rods and traverse rods illustrating the connection therebetween.

Brace members 21 extend along the perimeter of the open ended upper portion 20. Longitudinal members 22 are traversed across the brace members 21 to opposing sides of the die producing structure 100. The longitudinal members 22 are essentially flattened rods having an upper flattened surface 24. Secured to the upper flattened surface 24 are a plurality of eyelets or rings 26 spaced at predetermined intervals along the flattened member 22. As can be seen in FIG. 2A the eyelets 26 are grouped in pairs for reasons explained hereinafter. Each eyelet 26 traverses the flattened surface 24 of the longitudinal member 22 as can best be seen in FIG. 2B. Each longitudinal members 22 is positioned so that the eyelets 26 on one longitudinal member 22 are parallel to an adjacent eyelet 26 on an adjacent longitudinal member 22. As can be seen in FIG. 2A, the longitudinal members 22 and corresponding eyelets 26 are positioned and sized to accommodate traverse tubular rods 28 through the eyelet 26 such that each traverse rod 28 essentially is perpendicular to the longitudinal members 22. FIG. 2A illustrates the positioning of the traverse rods 28 relative to the longitudinal members 22, although in use, the traverse rods 28 are positioned on the longitudinal members 22 later during the insertion of wooden cores. The function of the longitudinal members 22 and traverse rods 28 will be explained hereinafter.

Figure 3:
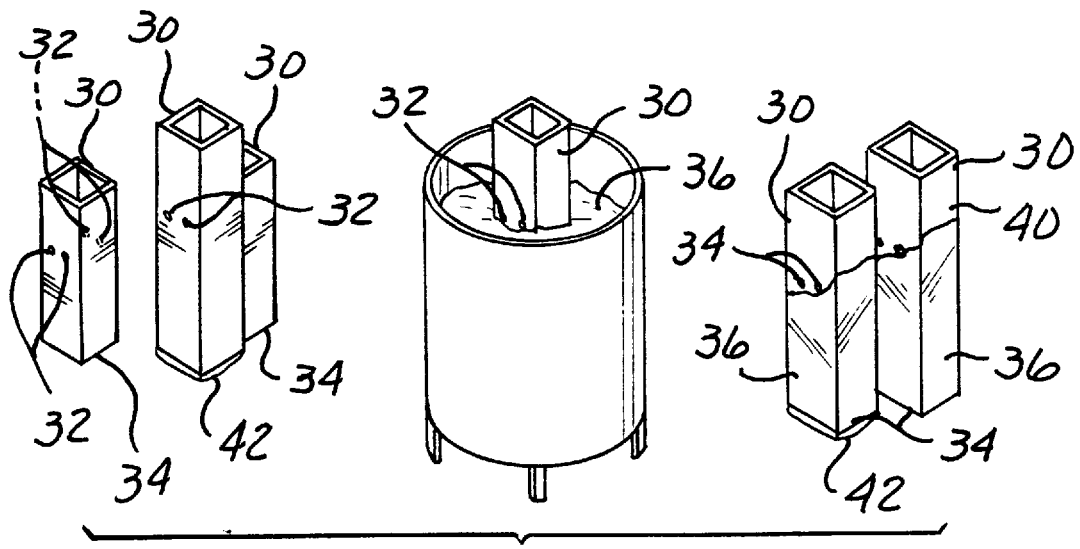
FIG. 3 is a view of sectional cores during the coating process.
Figure 4:
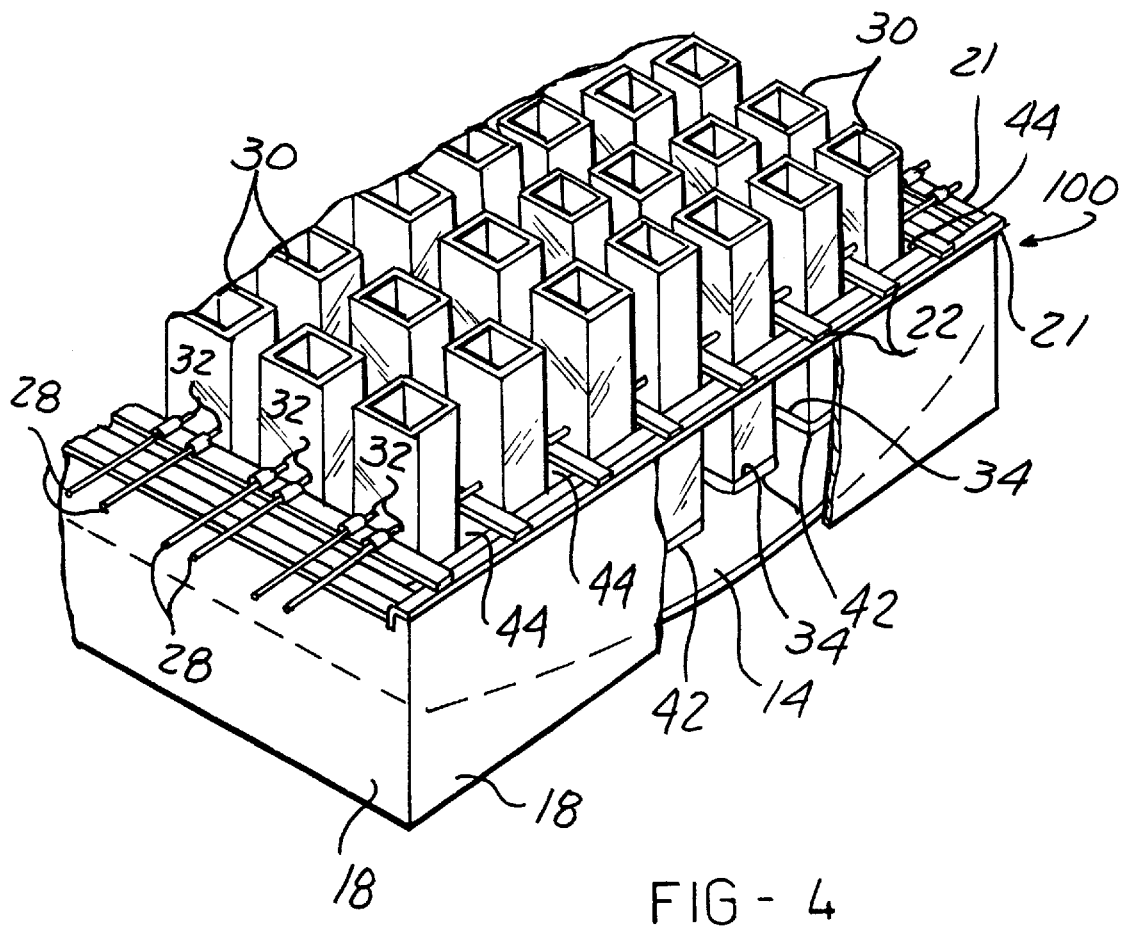
FIG. 4 is a view of the placement of the sectional cores within the die producing structure.

A plurality of rectangular wooden cores 30 are used for placement within the die producing structure 100 to define a honeycomb for injection of the hardenable material 38. Within the die producing structure 100, the cores 30 will be positioned according to the locations of the pairs of eyelets 26. Each wooden core 30 is formed by an elongated hollow box for placement within the die producing structure 100 in a vertical position. As shown in FIGS. 3 and 4, each core 30 has a pair of through apertures 32 on opposing sides of the core 30 that correspond with the pairs of eyelets 26 so that a pair of traverse rods 28 may be received through apertures 32 to extend through core 30 and pair of eyelets 26. The through apertures 32 are spaced at a predetermined height position above the bottom closed end 34 of the core 30. Each row of cores 30 are spaced by the longitudinal members 22. Feeding the traverse rods 28 through the wooden cores 30 and eyelets 26 maintain the cores 30 in a stationary position. The bottom 34 of each core 30 is also maintained at the predetermined height above the contour floor 14 of the die producing structure 100.

As shown in FIG. 3, each core 30 before being inserted into the die producing structure 100 is preferably partially coated with a microcrystalline material 36, such as wax, to prevent the hardenable material 38 that is later injected into the die producing structure 100 from adhering to the exterior surfaces 40 of the cores 30. As shown, the core 30 is not entirely coated with the micro crystalline material 36. The core 30 is coated only below the through apertures 32.

In addition, a selected number of the wooden rectangular cores 30 may also include a preformed lower extension 42 added to the bottom 34 of the core 30 and shaped to conform to the variance of the contour floor 14 at a prescribed location of the core 30 within the die producing structure 100. The lower extensions 42 on the selected cores are preferable made of a heat resistant material so that the hardenable material 38 does not penetrate the extensions 42 when injected into structure 100. The lower extensions 42 added to the bottom 34 of a selected number of cores 30 allow the space between the bottom of the core 30 and the contour floor 14 of the die producing structure 100 to maintain a relatively constant distance of approximately five inches. The distance between the floor 14 and the cores 30 are determined by manufacturing requirements and can vary from approximately four to six inches.

As shown in FIG. 4 and in phantom in FIG. 2A, the wooden cores 30 are placed within the die producing structure 100 such that the through apertures 32 on the cores 30 are positioned in alignment with parallel eyelets 26 so that the traverse rods 28 may be received through corresponding parallel eyelets 26. Therefore a row of wooden cores 30 are held at a predetermined distance from the contour floor of the die producing structure 100 and held in position by the traversed rods 28 therethrough.

Figure 5:
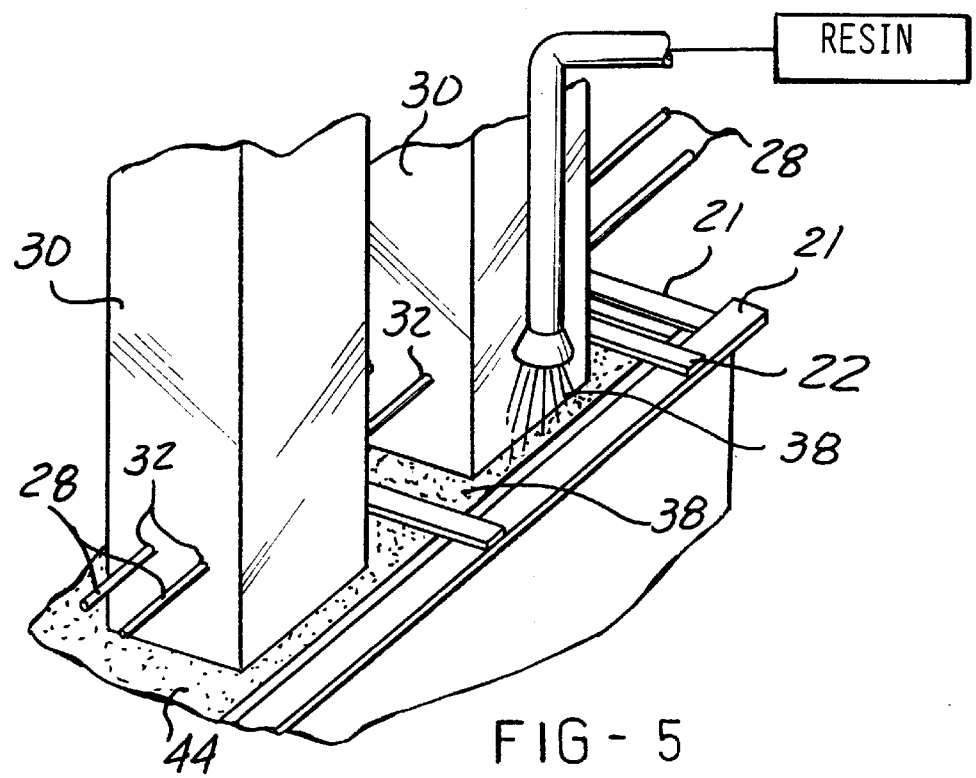
FIG. 5 is a schematic view of plastic material being ejected into the die producing structure between the sectional cores.
Figure 6:
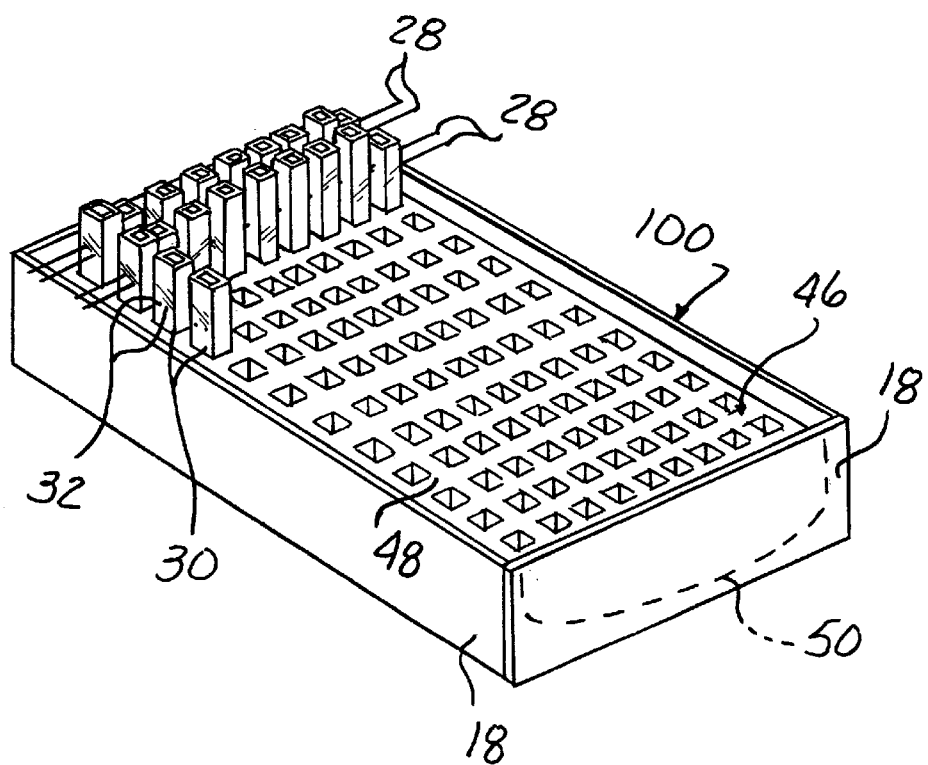
FIG. 6 is a perspective view of the solidified plastic die having a honeycomb surface within the die producing structure.

Once the die producing structure 100 is filled with the essentially evenly spaced wooden cores, a supply of resin, such as plastic, or other appropriate hardenable material 38 is injected into the cavity 44 of the die producing structure 100 formed around the cores 30, as shown in FIG. 5. The hardenable material 38 is allowed to solidify by conventional methods. Once the resin or hardenable material 38 has solidified, the traverse rods 28 are pulled from the wooden cores 30. The wooden cores 30 can then be easily removed from the die producing structure 100 along with the longitudinal members 22. The upwardly extending walls 18 of the die producing structure 100 are also removed so that the casted die 46 may be removed from the lattice framework 10. The resultant die 46 provides a honeycomb back surface 48 and a contour front surface 50 that coincides with the desired contour of the die. The contour front surface 50 will have a depth of approximately five inches or other manufacturer required depth as a result of the spacing of the cores 30 from the floor 14 in the die producing structure 100. This depth will provide stability to the resultant die 46.

Figure 7:
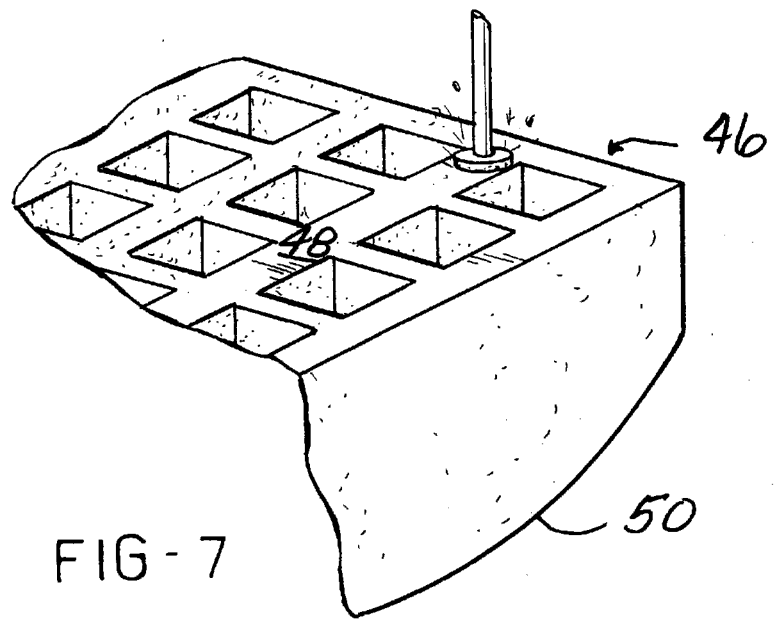
FIG. 7 is a partial view of the solidified plastic die during the machining process of the honeycomb surface.
Figure 8:
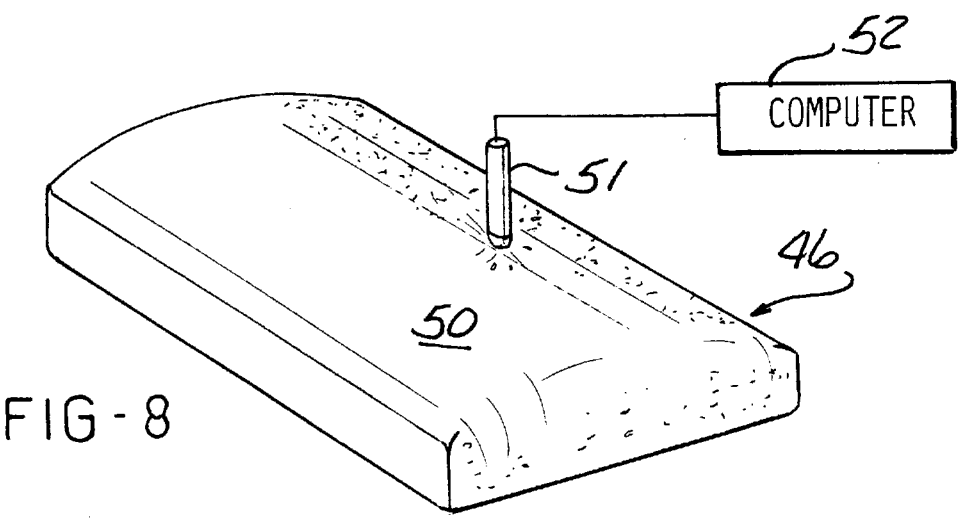
FIG. 8 is a perspective view of the machining process of the contour surface of the plastic casting die.
Figure 9:
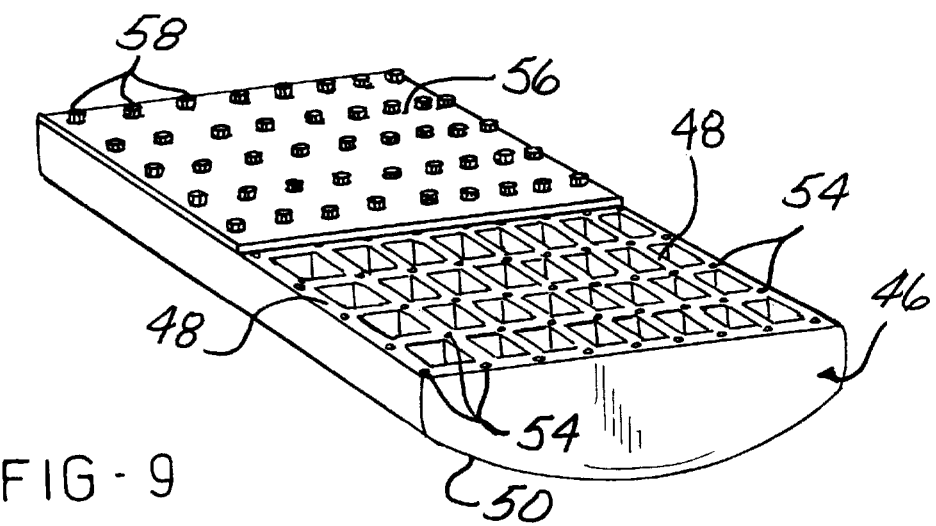
FIG. 9 is a perspective view of the plastic casted die having drilled holes at intersections of the honeycomb surface.

The honeycomb surface 48 is then machined to remove jagged edges and burrs as shown in FIG. 7. The contour front surface 50 is also machined by a five axis NC milling machine 51 that is computer 52 controlled to the precise measurements and contour of the die required. After the final die 46 is machined, apertures 54 are drilled at the cross sections of the honeycomb surface 48 of the die mold 46. A solid base structure 56 may then be secured onto the honeycomb surface via screws or bolts 58 drilled into the aperture 54 at the cross sections. Only a portion of a solid base structure 56 needs to be attached to the honeycomb surface in order to provide a slidable surface for the base that does not damage the honeycomb surface 48.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. It is understood that manufacturing requirements may include modification to the contour front surface 50 after machining. An example of such a requirement would be apertures for dowel or bolt locations in the contour surface 50.

What is claimed is:

1. A method of casting a rigid plastic die comprising the steps of:

constructing a container having a floor and four walls forming an open end and a cavity therein, wherein the floor of the container is configured in a desired contour shape of the die;

providing a plurality of longitudinal members having rings secured to one side of each longitudinal member, wherein the rings have an aperture therethrough traversing the one side of the longitudinal member;

extending the longitudinal members over the open end across two opposing walls of the container;

providing a plurality of box-shaped cores having aligned apertures through opposing walls of the box-shaped cores;

inserting the boxed-shaped cores into the container by aligning the aligned apertures of the box-shaped cores with the aperture of at least one ring and;

traversing rods across said longitudinal members by threading said rods through said ring and aligned apertures of the cores;

spacing each core essentially equidistantly from each other, wherein the space within the container between the cores defines a cavity;

pouring hardenable plastic material into the cavity of said container; and removing the plurality of cores from the container after said material has hardened.

2. The method of claim 1 further including the step of:

coating a portion of each box-shaped core below the aligned apertures with a microcrystalline material prior to inserting the cores into the container.

3. The method of claim 1 further including the step of spacing the bottom surface of each core from the floor approximately four to six inches.

4. The method of claim 1 further including the steps of:

removing the hardened material from the container to expose exterior surfaces of the hardened material; and machining the exterior surfaces to a precise contour shape.

5. The method of claim 3, wherein a select number of cores have extensions attached to their bottom surfaces such that the cores are placed in the container in predetermined locations so that the spacing between the floor and one of the extensions and bottom surface of each core is approximately four to six inches.

6. A method of casting a rigid plastic die having a contour surface comprising the steps of:

constructing a framework having a bottom planar surface and a top surface spaced from the bottom surface and having a shape essentially duplicating the contour surface of the die;

enclosing the periphery of the framework with upwardly extending walls such that the periphery of the framework is entirely enclosed and the walls extend above the top surface forming a container with an open ended upper portion;

extending brace members along the periphery of the framework on the open ended upper portion;

providing longitudinal members having a flattened upper surface with a plurality of rings secured thereon;

extending the longitudinal members across opposing brace members;

positioning the longitudinal members so that the rings on adjacent longitudinal members are aligned forming a row;

providing a plurality of box-shaped cores having aligned apertures through opposing walls of the box-shaped cores;

inserting the box-shaped cores into the container by aligning the apertures of the cores with a row of rings;

threading rods through the row of rings of the longitudinal members and the aligned apertures;

pouring hardenable plastic material into the cavity of the container;

allowing material to solidify to a rigid structure forming the casted die; and removing the plurality of cores from the container after the material has solidified forming a honeycomb surface.

7. The method of claim 6 further including the step of:

maintaining a distance of approximately four to six inches between the box-shaped cores and the contoured top surface by adding lower extensions to bottoms of predetermined cores coinciding with the contour shape of the top surface.

8. The method of claim 6 further including the step of:

after removing the plurality of cores from the container, removing the upwardly extending walls from the casted die;

removing the casted die from the framework;

machining the casted die to remove jagged edges and burrs;

drilling apertures at cross-sections of the honeycomb surface and;

securing a solid base structure to the honeycomb surface by attaching said base structure with fasteners into the drilled apertures.

* * * * *